United States Patent Office 3,715,378
Patented Feb. 6, 1973

3,715,378
FLUORINATED PEROXY POLYETHER COPOLYMERS AND METHOD FOR PREPARING THEM FROM TETRAFLUOROETHYLENE
Dario Sianesi and Adolfo Pasetti, Milan, and Giorgio Belardinelli, Modena, Italy, assignors to Montecatini Edison S.p.A., Milan, Italy
No Drawing. Filed Feb. 2, 1968, Ser. No. 702,533
Claims priority, application Italy, Feb. 9, 1967, 12,460/67
Int. Cl. C07c 51/58, 59/22
U.S. Cl. 260—463     7 Claims

ABSTRACT OF THE DISCLOSURE

Fluorinated linear polyethers of the general formula $$A-O-(C_2F_4-O-)_P-(CF_2-O-)_Q-(O)_R-B$$

wherein $C_2F_4$ represents a perfluoroalkylene unit derived from the opening of a double bond of a molecule of tetrafluoroethylene; the two perfluoroalkylene units have a random distribution along the polyether chain; —(O)— represents an oxygen atom having a random distribution along the polymer chain and linked in the peroxidic form to the different oxyperfluoroalkylene units; A and B may be the same or different and each is a radical selected from the group consisting of $CF_3$—, —COF, and —$CF_2$—COF; P and Q are each from 1 to 199, R is from 0 to 199, the sum of $P+Q$ is between 2 and 200, the ratio $Q/P$ is between 0.1 and 10, the ratio $R/P$ is between 0 and 1, and the ratio $R/(P+Q+1)$ is between 0 and 0.8. Also includes derivatives of such polyethers, as by hydrolysis, esterification, salt formation, amidation, dehydration of the amide to a nitrile, and decarboxylation. Method of preparing polyethers by photochemical reaction of molecular oxygen with a solution of perfluoroethylene. These peroxy-polyethers can be used as hydraulic fluids, heat-exchange liquids, lubricants and as plasticizers.

CROSS REFERENCES TO RELATED APPLICATION

Reference should be had to U.S. patent application Ser. No. 446,292, filed Apr. 7, 1965, now Pat. No. 3,442,942, and U.S. patent application Ser. No. 650,257 filed June 30, 1967, now abandoned, each of which will be discussed hereinafter.

BACKGROUND OF THE INVENTION

(1) Field of the invention

The present invention relates to new compounds having a polymeric character, consisting essentially of carbon, fluorine and oxygen atoms, having a linear polyether structure, and containing in the polymeric chains at least two perfluoroalkylene units that are different from one another. The invention further relates to a process for the preparation of such polymeric products together with tetrafluoroethylene epoxide. The process is based on a particular manner of obtaining direct combination between tetrafluoroethylene and molecular oxygen.

(2) Description of the prior art

In the chemical literature there have recently been described various methods of obtaining, from the combination of tetrafluoroethylene with oxygen, substances of a polymeric character, having a more or less high molecular weight and having structures of various types. For instance, tetrafluoroethylene slowly reacts, in the absence of light, with molecular oxygen under pressure (Chem. Ind. 1964, page 659, Pajaczkowski, et al.), to thereby obtain an explosive polymeric material having a structure of the type (—$CF_2$—$CF_2$—O—O—)$_n$.

It also has been taught that gaseous tetrafluoroethylene will react with molecular oxygen by the action of ultraviolet light, leading to the formation of a mixture of liquid and solids materials having the structure of poly(oxyperfluoromethylene), —($CF_2O$)$_n$—. Such compounds therefore have a chemical structure very different from that of the aforedescribed polyperoxides, although they have the same elemental composition. They obviously differ also due to their lack of oxidizing power and their higher thermal stability. See Belgian Pat. No. 657,823 of Soc. Edison, now Montecatini Edison, S.p.A.

Another polymeric product that should be mentioned although it is not derived from the direct combination of the olefin with oxygen, is that obtained by polymerization of tetrafluoroethylene epoxide. See French Pat. No. 1,324,665 and French Pat. No. 1,342,523 of Du Pont. In this instance, there results a polyether product that does not exhibit any oxidizing power and has a structure of the type —($CF_2$—$CF_2$—O)$_n$—.

From the foregoing, it will be seen that various types of oxygen-containing polymeric substances deriving from the oxidation (with various methods) of tetrafluoroethylene are known, and that the various polymeric substances can essentially be divided in two classes: polymers consisting of —$CF_2$— units linked to each other through oxygen bridges (namely perfluorooxymethylene polymers), and polymers consisting only of —$CF_2CF_2$—units linked to each other through only ether bridges or through only peroxidic bridges.

In addition to these various types of polymeric substances, all of which are characterized by a succession of the same perfluoroalkylene units, linked by ether or peroxidic bridges, there have been described in two preceding patent applications a process based on the photochemical reaction of a perfluorinated olefin in the liquid phase with molecular oxygen, which leads to the formation of a new class of polymeric perfluorinated compounds. These products consist essentially of perfluoroalkylene units derived from the opening of the double bond of the olefin, connected to each other in part by ether bridges and in part by peroxidic bridges. See previously mentioned U.S. patent application Ser. No. 446,292, filed Apr. 7, 1965 and U.S. patent application Ser. No. 650,257, filed June 30, 1967.

It has been observed in the foregoing applications that the oxygen bridges of the two types (ether and peroxidic) were present in the chain, with their ratios varying as desired within a wide range, depending on the synthesis conditions. Among the olefins that could be subjected to this type of oxidation, there was disclosed in U.S. patent application Ser. No. 446,292 tetrafluoroethylene in admixture with other fluorinated olefins. Thus, in one example there was illustrated the photochemical reaction in the liquid phase of mixtures of tetrafluoroethylene and hexafluoropropylene. Evidently in this instance the resulting products were polymeric substances of a complex nature in which, however, the units of the chain which were derived from the starting tetrafluoroethylene were exclusively of the two types —$CF_2$—$CF_2$—O— and

—$CF_2$—$CF_2$—O—O— these units being present together with perfluoroalkylene units derived from the other perfluorinated olefin. The foregoing process of photochemical oxidation in the liquid phase heretofore did not appear overly valuable when applied solely to tetrafluoroethylene, due to the very high tendency that this olefin exhibited towards homopolymerization, with the resulting formation of high polymers containing $C_2F_4$ units directly bound to one another.

SUMMARY OF THE INVENTION

We have now surprisingly found that under suitable reaction conditions it is possible to obtain, by direct photochemical combination of tetrafluoroethylene with oxygen, oligomeric products having the structure of polyethers, in which the ether bridges can be partially replaced by peroxidic bridges and whose polymeric chain contain at the same time, as fluorinated constituent units, perfluoroalkylene groups of at least two types, —$CF_2$— and —$CF_2$—$CF_2$—.

The present invention thus relates to new fluorinated polyether products of the general formula

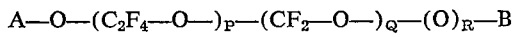

A—O—$(C_2F_4$—O—$)_P$—$(CF_2$—O—$)_Q$—$(O)_R$—B wherein $C_2F_4$ represents a perfluoroalkylene unit derived from the opening of the double bond of a tetrafluoroethylene molecule; the two perfluoroalkylene units are randomly distributed along the polyether chain; —(O)— represents an oxygen atom having a random distribution along the polymer chain and linked in the peroxidic form to the different oxyperfluoroalkylene units; A and B may be the same or different group and are each selected from the group consisting of $CF_3$—, —COF and —$CF_2COF$; P, Q and R may be the same or different whole numbers, or R may be equal to zero; the sum of $P+Q$ is a number between 2 and 200; the ratio $Q/P$ is a number between 0.1 and 10, preferably between 0.2 and 5; the ratio $R/P$ is between 0 and 1 and preferably between 0 and 0.3; and the ratio $R/(P+Q+1)$ is a number between 0 and 0.8 and preferably between 0 and 0.3. Polyethers of this type can therefore be considered and defined generally as copolymeric polyether-polyperoxides. The invention further relates to a method of making such products.

The invention further includes the derivatives of the foregoing products, as by hydrolysis, esterification, salt formation, amidation, dehydration of the amide to nitrile, and decarboxylation.

DESCRIPTION OF THE PREFERRED EMBODIMENTS

These copolymeric polyether-polyperoxides, as compared to the homopolymeric products containing only the units —$(C_2F_4$—O—) or —$(C_3F_6$—O)—, have a relatively higher frequency of C—O bonds with respect to the C—C bonds in the oligomeric chain. This results in a lower rigidity in the molecular structure and consequently the products advantageously have a lower viscosity at the same molecular weight, or a lower volatility at the same viscosity. Another advantage results from the fact that there is less variation of viscosity with temperature. It is in fact known that whereas C—C bonds have a considerable energy barrier which opposes their rotation, this is not so for the —C—O— bonds. Therefore, a higher bond ratio —C—O—/—C—C— in the main chain results in the aforedescribed effects.

The two different perfluoroalkylene units forming the chains of the new polyether products are to be considered as being randomly distributed since there are no particular criteria present that would impose either successions of the same units or alternations of the different units. On the other hand, the units indicated with the symbol (—O—) correspond to the presence of peroxidic bonds. Thus these units (—O—) cannot lead to sequences but must be considered as being between two fluorinated units.

The polyether products of the invention are normally obtained as mixtures of different molecules, each molecule having a well defined molecular weight, a certain distribution of the various units in the chain, a given value of indexes P, Q and R (which for each such molecule are exclusively whole numbers), and a well defined structure of terminal groups A and B. The mixture of molecules forming the actual product, by contrast, is obviously defined by average values of molecular weight and of the elemental composition. Consequently the indexes P, Q and R in this case may assume values that are not necessarily represented by whole numbers.

The present invention further relates to a process for the preparation of tetrafluoroethylene epoxide along with the previously defined linear perfluorinated copolyethers, by photochemical reaction with molecular oxygen of a liquid phase consisting of a solution in an inert solvent of perfluoroethylene, in the presence of ultraviolet light containing radiations having a wave length lower than 3,300 A., by using an average irradiation intensity corresponding to a value between 0.5 and 30 watt/cm.² The average irradiation intensity I, is defined as the ratio $$\frac{100 \times E}{S^{\frac{1}{2}} V^{\frac{1}{2}}}$$

wherein E is the amount of U.V. radiations (in watts) having a wave length lower than 3,300 A. and penetrating the reaction system having a volume of V cm.³ through a transparent surface of S cm.² The temperature for the reaction should be between —80° C. and +10° C., and preferably between —60° C. and +10° C., and the pressures should be between 0.5 and 10 atmospheres, and preferably at pressures near or at atmospheric pressure. The reaction is carried out in the inert liquid solvent in which $C_2F_4$ is dissolved in a concentration from 0.005 to 1 mole/liter of solution, preferably from 0.015 to 0.5 mol/liter of solution, with the reacting solution being kept saturated with molecular oxygen with a partial $O_2$ pressure from 0.3 to 2 atmospheres, and preferably from 0.5 to 1 atmosphere.

The selection of the solvent, the temperature of the reaction liquid phase, and the pressure to which the reacting system is subjected must be such that the concentration of tetrafluoroethylene dissolved in the liquid phase is within the foregoing limits.

Indeed, when the concentration of tetrafluoroethylene in the liquid phase reaches relatively high values with respect to the amount of oxygen, which under the reaction conditions, can be dissolved by such liquid phase, the ultraviolet irradiation causes the homopolymerization of $C_2F_4$. In this case the main reaction product is polytetrafluoroethylene, together with small amounts of products of the present invention. These latter products, if desired, can be separated from polytetrafluoroethylene, but only by means of laborious solvent extraction processes. By contrast, by using lower concentrations of olefin in the liquid phase, the polymerization to polytetrafluoroethylene does not occur and the main products of the photochemical reaction are those of the present invention. The concentration of $C_2F_4$ in the liquid phase is also critical as regards the ratio $Q/P$ relating to the two types of units in the polymeric chains. According to our findings, the lower the $C_2F_4$ concentration, the higher the $Q/P$ ratio. It is not possible to exactly establish the highest concentration of $C_2F_4$ that can be employed without resulting in its photochemical homopolymerization since this maximum concentration may be a function of other variables such as, e.g., the nature of the solvent, the irradiation intensity, etc.

For certain of the conditions exemplified hereinbelow, the concentration above which the formation of homopolymer $(C_2F_4)_n$ becomes significant appears to be of the order of about 0.5 mol of olefin per liter of solution. In the range of lower concentrations, the lowest employed was merely a matter of convenience in maintaining a reaction rate that was not excessively low for the desired type of products. Thus, the reaction proceeds satisfactorily even with concentrations of the order of 0.002 mol of olefin per liter of solution.

The present process contemplates the use of reacting solutions containing from 0.005 to 1 mole of $C_2F_4$/liter of solution. The preferred concentrations are from about 0.015 to 0.5 mole/liter of solution.

By operating within the foregoing concentrations, the photochemical oxidation is carried out by keeping the reaction medium saturated with molecular oxygen under the selected total pressure, as indicated hereinbelow, and under a partial oxygen pressure normally between 0.3 and 2 atmospheres. The partial oxygen pressure is preferably kept at between 0.5 and 1 atmosphere.

As solvents there may be used materials which are liquid at the reaction temperature, are inert towards the reactants used and to U.V. radiations, and have a sufficient dissolving power with respect to tetrafluoroethylene. Preferably, there are employed halogenated solvents such as perfluorocyclobutane,
perfluorodimethylcyclobutane,
perfluorobenzene,
perfluorocyclohexane,
perfluoropropylpyran,
1,1,2-trichloro-1,2,2-trifluoroethane,
1,2-dichlorotetrafluoroethane,
1,1,1-trifluorotrichloroethane,
difluorodichloromethane,
trifluorochloromethane,
trichlorofluoromethane,
carbon tetrachloride,
chloroform,
methylene chloride, etc.

The temperature and pressure conditions under which the photochemical oxidation is carried out may vary within wide limits and are selected so as to maintain the olefin concentration in the liquid phase at a value within the above specified limits, depending on the solvent used and on the desired type of products. From a general point of view, the reaction may be carried out at temperatures between about $-80°$ C. and $+10°$ C. and under total pressure of the reacting system between about 0.5 and 10 atmospheres. Preferred reaction conditions are temperatures between $-60°$ C. and $+10°$ C. and pressures of the order of 1 atmosphere.

The liquid reaction phase is irradiated with U.V. light containing radiations having a wavelength less than 3,300 A. from a suitable source such as, e.g., a mercury vapor lamp.

We have found that the average intensity of irradiation (I) of the liquid phase is normally such that the resulting value of the index $$I = \frac{100 \times E}{S^{1/2} \times V^{1/3}}$$

is between 0.1 and 100 watts/cm.$^2$, and preferably between 0.5 and 30 watts/cm.$^2$, wherein E=energy in watts of the U.V. light with a wavelength lower than 3,300 A. penetrating the reaction system having a volume of V cm.$^3$ through a transparent surface of S cm.$^2$.

One of the preferred methods for realizing the process of the present invention involves feeding into a reactor containing as the liquid phase a solvent such as one of those described above, a gaseous stream consisting of a mixture of oxygen and tetrafluoroethylene in molar ratios between 20 and 0.5, and preferably between 10 and 1. The liquid phase is maintained at the desired temperature by means of a thermostatic bath and under a given total pressure (which preferably is atmospheric) by a suitable pressure regulation system. A mercury vapor lamp, which may even be directly immersed in the reaction system, supplies the required U.V. light. In this way, the amount of olefin which is present in solution in the liquid phase during the irradiation reaches its equilibrium concentration, which concentration remains constant for the entire reaction time. The copolyether products that are gradually formed remain dissolved or suspended in the reaction medium. The products of lower molecular weight such as, e.g., $CF_2O$, $CF_3$—COF, and the epoxide $C_2F_4O$ are preferentially removed by the gaseous stream leaving the reaction zone, together with the excess oxygen and any unconverted tetrafluoroethylene. At the end of the reaction, the high molecular weight products are readily obtained by simply evaporating the solvent.

The copolyether products obtainable by the reaction of oxygen with tetrafluoroethylene under the aforedescribed conditions show an empirical formula that can be expressed as $(CF_2O_x)_n$, wherein the value of $x$ may be between the limits of 0.60 and 1.32. The value of $x$ is a function (1) of the value of $n$ (which can be between about 5 and 200), (2) of the type of terminal groups, and (3) of the quantitative ratios existing between the perfluoroalkylene units of the two types and the peroxide group.

The determination of the average structure of these copolyethers is carried out using conventional analytical methods. The elemental analysis and a determination of the average molecular weight give the empirical formula of composition. Iodometric analysis reveals the amount of oxygen bound in the peroxidic form. The nuclear magnetic resonance (NMR) spectrum of fluorine gives the other data relating to the structure of the present copolyethers, with the constituent groups being listed hereinafter.

| Groups | P.p.m. (from $CFCl_3$) | Number of fluorine atoms |
|---|---|---|
| .O.$CF_2$.$CF_2$.O.$CF_2$.O.$CF_2$.$CF_2$.O | +51.9 | 2 |
| .O.$CF_2$.$CF_2$.O.$CF_2$.O.$CF_2$.O | +53.6 | 2 |
| .O.$CF_2$.O.$CF_2$.O.$CF_2$.O | +55.3 | 2 |
| .O.$CF_2$.$CF_2$.O.$CF_2$.$CF_2$.O.$CF_2$.$CF_2$.O | +89.3 | 4 |
| .O.$CF_2$.O.$CF_2$.$CF_2$.O.$CF_2$.O | +91 | 4 |
| $CF_3$.O.$CF_2$.O | +57.8 | 3 |
| .O.$CF_2$.O.COF | +15 | 1 |
| .O.$CF_2$.COF | −13.3 | 1 |

As will be noted, from the nuclear magnetic resonance spectrum of fluorine it is possible to obtain the required qualitative and quantitative information relating to the actual average structure of the copolyethers.

The present invention also includes new copolymeric perfluorinated polyether products which can be obtained by subsequent chemical reactions from those products obtained directly by photochemical reaction of oxygen with tetrafluoroethylene. Transformations of this type can be carried out by use of processes described in previously discussed U.S. applications Ser. Nos. 446,292 and 650,257 with respect to perfluorinated polyethers consisting essentially of a succession of $C_3F_6$ units bound to each other by either ether or peroxidic bridges. The chemical transformations may involve either a variation of the content of peroxidic groups in the chains or a variation of the nature of the terminal groups and, possibly, of one or more fluorinated units immediately preceding such terminal groups.

The peroxidic group content of the copolyether can, for example, be reduced and, as a limit, eliminated, by thermal treatment at a temperature between 100° and 250° C., or by irradiation with U.V. light of the copolyethers either in the pure state or in solution in inert solvents.

As solvents there are employed halogenated solvents such as perfluorocyclobutane, perfluorodimethylcyclobutane, perfluorobenzene, perfluorocyclohexane, perfluoropropylpyran, 1,1,2-trichloro-1,2,2-trifluoroethane, 1,2-dichlorotetrafluoroethane, 1,1,1 - trifluorotrichloroethane, difluorodichloromethane, trifluorochloromethane, trichlorofluoromethane, carbon-tetrachloride, chloroform, methylene chloride, etc.

Other transformations relate essentially to the terminal groups; e.g. the terminal group —O.$CF_2CF_2$O·COF (or in general the terminal group

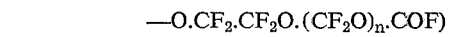

—O.$CF_2$.$CF_2$O.$(CF_2O)_n$.COF)

By simple thermal treatment (at 200–300° C.) these groups are transformed into the terminal group

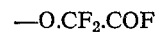

—O.$CF_2$.COF with the formation of $CF_2O$. Analogous transformations of terminal groups can be obtained at temperatures lower than 100° C. by the action of bases.

From the acid terminal group —O.$CF_2$.COF, by reactions of known type, a great number of derivatives can be obtained.

For example, water reacts with this group, thus giving the corresponding fluorinated copolyethers having as the terminal group a carboxylic acid group. This, in turn, can be transformed into a salt, ester, amide, or nitrile by known reactions.

A typical reaction is the decarboxylation of salts (e.g. alkaline salts) of the preceding acid polyethers, as by heating to temperatures generally higher than 150° C., in the presence of hydrogen donor substances (e.g., water, alcohols, glycols, alkaline hydroxides, etc.). There results the formation of neutral terminal groups of the type —O.$CF_2$H.

The fields of application of the products of the present invention depend on the particular chemical structures of these products and on their properties. Those polyethers having a high content of peroxidic bridges can be used as initiators of free-radical polymerizations, more particularly, for the free-radical polymerization of fluorinated olefins, or as cross-linking agents for elastomeric fluorinated polymers and copolymers.

Non-peroxide polyethers having neutral terminal groups are liquids which, depending on their molecular weight, will have boiling temperatures of the order of e.g., 10 to 50° C. under atmospheric pressure, to more than 200° C. under reduced pressures (e.g., at 1 mm. Hg). They can be used as hydraulic fluids, heat-exchange liquids, lubricants and as plasticizers for fluorinated elastomeric or plastomeric polymers. They, in fact, combine exceptional chemical and thermal stability with good lubricating and plasticizing properties.

The crude non-peroxidic copolyethers having acid terminal groups, and especially the copolyethers having amide, ester and nitrile terminal groups, are also useful as hydraulic fluids, as plasticizers for fluorinated elastomeric or plastomeric polymers, etc.

The following examples will further illustrate our invention. All parts are by weight unless otherwise stated.

EXAMPLE 1

500 cc. of 1,1,2-trichloro-1,2,2-trifluoroethane were introduced into a 600 cc. glass reactor having a cylindrical shape and a diameter of 70 mm., provided with an inner coaxial transparent quartz tube having an outer diameter of 20 mm. and a length of 200 mm., and provided also with a dipping tube for the introduction of gases and with a reflux condenser kept at a temperature of —80° C. Through the dipping tube a gaseous mixture consisting of 40 liters/hour of oxygen and 20 liters/hour of tetrafluoroethylene was bubbled through the reactor. The two gases were withdrawn from two gasholders, dried and sent to the reactor through an adjusting system which assured a constant flow and a substantially atmospheric pressure.

There was thus obtained at the equilibrium conditions during the run a concentration of $C_2F_4$ dissolved in the reacting liquid phase of a value of about 0.2 mol per liter of solution. The partial oxygen pressure (in atmospheres) was equal to the molar fraction of oxygen in the gaseous mixture $O_2+C_2F_4$ fed in the reacting solution. By means of a bath placed outside the reactor, the temperature of the solution contained in the reactor was adjusted to a value of —10° C. and was then kept at this value during the entire run. At this point a U.V. lamp of the high-pressure, Hanau TQ 81 type was introduced into the quartz tube and was switched on. The irradiation and feeding of the gaseous mixture to the reactor were continued for 3 hours.

The gases leaving the reflux condenser were bubbled through an aqueous KOH solution in order to retain and neutralize the volatile acid products formed during the reaction, and were then dried and condensed in a trap at such a temperature as to make it possible to retain unreacted tetrafluoroethylene and the epoxide thereof (formed during the reaction), eliminating the excess oxygen.

At the end of three hours, the lamp was switched off, the $C_2F_4$ gas stream was stopped, and oxygen was bubbled again for a further 10 minutes in order to transfer into the washing solution the volatile acid products still dissolved in the reaction mixture. The solvent was then removed from the reactor by evaporation under reduced pressure. 24.5 g. of a liquid polymeric product remained as residue.

In the aqueous KOH solution used for washing the gases leaving the reactor, fluorine was present (as KF) in an amount corresponding to the oxidation of 24 g. of $C_2F_4$ to $COF_2$. 72 g. of tetrafluoroethylene epoxide were caught in the trap together with 153 g. of unreacted $C_2F_4$.

The polymeric oily residue, weighing 24.5 g., by elemental analysis showed an average composition of 60.9% F. and 19.1% C., corresponding to the formula $CF_2O_{0.78}$, with an average molecular weight of about 2000. By iodometric analysis (reaction with NaI in solution of acetic anhydride plus $CF_2Cl.CFCl_2$ and successive titration of iodine with thiosulfate), there was determined a content of 0.7 oxygen atom combined in the peroxidic form per 10 oxygen atoms combined in the non-oxidizing form. By N.M.R. analysis this polymeric product appeared to consist of polyether chains containing units of the —$CF_2$O— type together with units of the

—$CF_2.CF_2$O— type in a molar ratio of 2:1.

The terminal groups of the polyether chains consisted of $CF_3$O— groups in two different forms, namely, $CF_3O.CF_2O$— and $CF_3O.CF_2.CF_2.O$— and also of acid groups of different types, namely: —O.$CF_2$.O.COF and, —O.$CF_2.CF_2$.O.COF,

—O.$CF_2$.O.$CF_2$.COF, —O.$CF_2.CF_2$.O.$CF_2$.COF

A portion (20 g.) of the product obtained by the foregoing process was dissolved in 150 cc. of 1,1,2-trichloro-1,2,2-trifluoroethane in a cylindrical glass reactor containing coaxially therein a U.V. lamp of the high pressure Hanau TQ 81 type and also provided with a reflux condenser kept at a temperature of —50° C.

A nitrogen stream was bubbled therethrough while keeping the solution at a temperature of —30° C. by means of an outer bath, the whole being irradiated for 8 hours. The solvent was then evaporated under reduced pressure, thus obtaining as the residue 18.5 g. of an oily substance having an oxidizing power corresponding to 0.1 oxygen atom bound in the peroxidic form per 10 oxygen atoms combined in the non-oxidizing form, and showing by elemental analysis the cmposition $CF_2O_{0.80}$.

By N.M.R. analysis, it appeared that the polymeric chain consisted of the same units present in the raw starting product (the quantitative ratio between —$CF_2$O— and —$C_2F_4$O— units was 3:1) and that the terminal groups were the same. A portion, corresponding to 14 g., of products thus stabilized was subjected to distillation under reduced pressure. 1.2 g. of a first fraction distilling between 74° C. and 110° C. under 15 mm. Hg, and 11.5 g. of a second fraction distilling between 94° and 230° C. under 1 mm. Hg, were obtained.

Another sample (20 g.) of a crude oily product obtained directly from the previously described synthesis was thermally treated in a glass vessel by heating gradually over two hours to a temperature of 220° C. and then keeping it at this temperature for a further period of 1 hour. A weight loss of 19.5% was noted, and the residual product had an oxidizing power corresponding to 0.1 oxygen atom bound in the peroxidic form per 10 oxygen atoms in the ether form. By elemental analysis, the composition appeared to correspond to $CF_2O_{0.75}$. By N.M.R. analysis the —$CF_2$O— and —$C_2F_4$O— groups appeared to be present in the ratio of 2:1. As regards the terminal groups, they were comprised of the groups —O.CF$_2$.COF and CF$_3$O—.

A portion (10 g.) of oily product obtained from the aforedescribed thermal treatment was heated in the presence of 1.75 g. of 80% KOH. The temperature was gradually increased to 220° C. and kept there for 20 hours. The residual mixture was then subjected to distillation. 4.8 g. of an oily product boiling between 75° C. (under a reduced pressure of 13 mm. Hg) and 270° C. (under a reduced pressure of 1 mm. Hg) were obtained. This product appeared neutral and, by N.M.R. analysis examination, the terminal groups were identified as CF$_3$O— and —O.CHF$_2$. The structure of the polymeric chain appeared to be very similar to that observed before the alkali treatment.

EXAMPLES 2 TO 6

By using the same apparatus as described in Example 1 and by operating analogously, a series of runs were carried out, varying either the temperature or the ratio between tetrafluoroethylene and oxygen forming the gaseous phase bubbled through the reaction mixture.

The concentration of C$_2$F$_4$ dissolved in the liquid phase at the equilibrium conditions during the run was kept at a value between 0.05 and 0.3 mol/liter of solution.

The O$_2$ partial pressure (in atmospheres) was kept equal to the molar fraction of oxygen in the O$_2$+C$_2$F$_4$ mixture fed to the reacting solution. In various runs, different solvents were used as the liquid phase.

The working conditions and the main data relating to the products obtained are set out in the following table. It should be noted that the characteristics of the polymeric products were based on experimental analytical results while, on the contrary, the ratios between the different structural units contained in the polymeric chain were derived from examination of the N.M.R. spectrum.

products were evaporated and collected in a strongly cooled trap. (Prior to collection, the volatile products were first washed by bubbling through an aqueous KOH solution.) A condensed mixture consisting of 56.8 g. of unreacted C$_2$F$_4$ and 43.3 g. of the epoxide of tetrafluoroethylene were thus obtained. From the reactor, the solvent was then removed by distillation under reduced pressure. 25.6 g. of a pasty semisolid substance remained as the residue, which residue was extracted by continuous extraction with CF$_2$Cl—CFCl$_2$.

The extraction residue consisted of 20.2 g. of solid polytetrafluoroethylene. Evaporation of the solvent present in the extractant phase resulted in the obtaining of 5.4 g. of a liquid viscous oily polymeric substance.

This substance had an average molecular weight of about 10,000, an elemental analysis corresponding to the composition CF$_{1.99}$O$_{0.64}$, and an active oxygen content corresponding to 0.77 g. of active O$_2$/100 g. of product.

From the N.M.R. examination, the structure of this oily substance was of the type:

$$A—O—(C_2F_4O)_P—(CF_2O)_Q—(O)_R—B$$

with $Q/P=0.5$ and $R/(P+Q+1)=0.047$ (It was not possible with the usual N.M.R. method to make an absolute determination of the nature of terminal groups A and B, due to the high molecular weight of the product.)

This example shows that by operating with an average concentration of tetrafluoroethylene in the inert liquid phase of about 0.7 mol/liter of solution and for the remainder operating under conditions suitable for the process of the present invention, it is possible to obtain a significant conversion of C$_2$F$_4$ into the polyethers of this invention. However, this is accompanied by a substantial amount of solid polymer of tetrafluoroethylene.

TABLE

| Example number | 2 | 3 | 4 | 5 | 6 |
|---|---|---|---|---|---|
| Reaction conditions: | | | | | |
| Temperature, °C | −10 | −10 | −10 | −10 | +10 |
| O$_2$/C$_2$F$_4$ ratio, by volume | 6 | 3 | 2 | 1.5 | 2 |
| C$_2$F$_4$ flow rate, in l./h | 6.6 | 20 | 20 | 20 | 20 |
| Solvent used | [1] Freon 113 | Freon 113 | [2] PFDMCB | Freon 113 | Freon 113 |
| Irradiation time, hours | 2.5 | 3 | 3 | 3 | 3 |
| C$_2$F$_4$ concentration in the reacting liquid phase, mols/liter | 0.20 | 0.20 | 0.20 | 0.30 | 0.05 |
| Products obtained: | | | | | |
| C$_2$F$_4$O epoxide, g | 16.2 | 58.0 | 60.4 | 75.4 | 65.0 |
| Polyether products, g | 3.7 | 19.5 | 29.3 | 22.6 | 16.2 |
| Recovered C$_2$F$_4$, g | 40.0 | 159.0 | 153.0 | 156.0 | 168.0 |
| Characteristics of the polyether products: | | | | | |
| Composition by elemental analysis | CF$_{1.93}$O$_{0.92}$ | CF$_{1.93}$O$_{0.84}$ | CF$_{2.00}$O$_{0.76}$ | CF$_{2.00}$O$_{0.80}$ | CF$_{2.00}$O$_{0.70}$ |
| Approximate average molecular weight | 1,500 | 2,000 | 5,000 | 5,000 | 2,000 |
| Active oxygen content, g. active O$_2$/100 g. product | 1.32 | 24.9 | 2.60 | 0.80 | 1.42 |
| Average structure, A—O(C$_2$F$_4$O)$_P$—(CF$_2$)O$_Q$—(O)$_R$—B: | | | | | |
| Q/P ratio | 5.7 | 2.0 | 1.0 | 2.3 | 1.5 |
| R/(P+Q+1), ratio | 0.06 | 0.12 | 0.15 | 0.04 | 0.10 |

[1] 1,1,2-trichloro-1,2,2-trifluoroethane.
[2] Perfluorodimethylcyclobutane.

EXAMPLE 7

1,400 cc. of perfluorodimethylcyclobutane were introduced into a cylindrical glass reactor having a volume of 1.8 liters (10 cm. diameter), provided with an inner coaxial quartz tube (having an outer diameter of 20 mm. and a length of 200 mm.) and provided also with a dipping tube for the introduction of gases and with a reflux condenser kept at a temperature of −100° C. The reactor was cooled to a temperature of −30° C. and 134 g. of tetrafluoroethylene (which dissolved in the solvent) were introduced through the dipping tube. Always keeping the temperature at −30° C., an oxygen stream was bubbled through the reactor with a flow rate of 20 l./h. and then, when saturation of the reaction mixture with oxygen was attained, a Hanau TQ 81 lamp was introduced into the quartz tube and was switched on.

Keeping the temperature in the reactor at −30° C., the irradiation of feeding of oxygen were carried on for 3 hours.

At the end of the that period, the lamp was switched off, bubbling of oxygen was stopped, and the volatile

COMPARATIVE EXAMPLE 7A (Outside the scope of the invention)

This example was carried out with the same apparatus and with essentially the same procedure as in Example 7. Into the reactor there were introduced 1,400 cc. of perfluorodimethylcyclobutane and 134 g. of tetrafluoroethylene. Keeping the temperature of the reaction mixture at −33° C., a gaseous stream of air was bubbled with a flow rate of 100 liters/h. and the whole was irradiated for 3 hours. After evaporation of the gaseous products, there were recovered 15 g. of epoxide C$_2$F$_4$O together with unreacted tetrafluoroethylene. 40 g. of polytetrafluoroethylene, after the removal of the solvent, remained as residue from which, by extraction, less than 0.2 g. of oily polyether products was obtained.

This example shows that if the reaction is carried out in a liquid phase saturated with oxygen under a partial pressure of 0.2 atmosphere, but, for the rest, operating as in preceding Example 7, the transformation of C$_2$F$_4$ into the copolyethers of the invention is reduced to virtually negligible values.

11
COMPARATIVE EXAMPLE 7B
(Outside the scope of the invention)

By operating as in Example 7, but at a temperature of −40° C., 200 g. of $C_2F_4$ were introduced by condensation into the solvent consisting of 1,400 cc. of perfluorodimethylcyclobutane. The $C_2F_4$ concentration was of the order of 1.5 mols per liter of solution. The photochemical reaction was carried out by feeding the reactor with $O_2$ at a flow rate of 20 l./h. under atmospheric pressure. After 3 hours, the reaction was stopped, the volatile products and the solvent were evaporated, and 120 g. of polytetrafluoroethylene were isolated from which, by extraction with perfluorodimethylcyclobutane, only 0.4 g. of oily copolyether was obtained.

This comparative example shows that even by operating at oxygen saturation under atmospheric pressure, too high a concentration of $C_2F_4$ in the reacting liquid phase causes essentially the formation of a homopolymeric product, with but a negligible yield of the copolyethers of our invention.

EXAMPLE 8

Using the same apparatus as described in Example 1, 500 cc. of dichlorodifluoromethane were introduced into the reactor. Through the dipping tube of the reactor there was bubbled a gaseous mixture consisting of 30 liters/hour of oxygen and 15 liters/hour of tetrafluoroethylene.

By means of an external bath, the temperature of the reaction mixture was kept at between −30° C. and −33° C. during the entire run. Under these conditions, the concentration of $C_2F_4$ dissolved in the reacting liquid phase had a value of about 0.2 mol per liter of solution. An U.V. ray lamp of the high pressure Hanau TQ 81 type was introduced into the quartz tube and was switched on. The irradiation and feeding of the gaseous mixture was carried on for 2 hours. The gases leaving the reactor were treated as described in Example 1.

After the 2 hours, the lamp was switched off, oxygen was bubbled through for a further 10 minutes and the solvent was then removed from the reactor by evaporation at room pressure (boiling point of $CCl_2F_2$ equals about −29° C.).

23.7 g. of a liquid polymeric product remained as the residue.

In the aqueous KOH solution used for washing the gases leaving the reactor, there was determined an amount of K.F. corresponding to the oxidation (to $COF_2$) of 17 g. of $C_2F_4$.

From the final condensation of the gases leaving the reactor there was recovered a mixture consisting of 62 g. of $C_2F_4$ and 42 g. of tetrafluoroethylene epoxide.

The oily polymeric residue, by elemental analysis, showed an average composition of 62.0% of F and 19.60% of C, corresponding to the formula $CF_2O_{0.70}$, with an average molecular weight of about 10,000.

By iodometric analysis (carried out using the conventional method) an active oxygen content of 0.85 g. per 100 g. of product was determined.

By N.M.R. analysis, this polymeric product appeared to consist of polyether chains containing the perfluoroalkylene units of both types —$CF_2$— and —$CF_2$—$CF_2$— in a molar ratio of 1:1. The terminal groups of the polyether chains were of the types already described in Example 1.

EXAMPLE 9

The preparation described in the preceding example was repeated, the only difference being that the temperature of the reaction mixture was kept, during the irradiation, at a value between −40° and −42° C. After bubbling of the $C_2F_4$/oxygen mixture for 2 hours, the solvent was removed. 48.8 g. of liquid polymeric product remained as the residue.

In the alkaline solution used for washing the gases leaving the reactor, KF was found to be present in an amount corresponding to the oxidation of 44 g. of $C_2F_4$.

The mixture of unreacted gases coming from the final condensation consisted of 28 g. of $C_2F_4$ and 26.6 g. of tetrafluoroethylene epoxide. The oily polymeric residue, by elemental analysis, showed an average composition of 61.9% of F and 19.50% of C, corresponding to the formula $CF_2O_{0.71}$. Iodometric analysis revealed an active oxygen content corresponding to 2.15 g. per 100 g. of product. N.M.R. analysis showed that the polyether chain contained perfluoroalkylene units of both types —$CF_2$— and —$C_2F_4$— in a ratio of 1:1.4.

EXAMPLE 10

The preparation described in Example 8 was repeated, the only difference being that the temperature of the reaction mixture during the irradiation was kept at a value between −50° and −60° C. After 2 hours of irradiation and the removal of the solvent, the residue amounted to 67.6 g. of a liquid polymeric product.

In the alkaline solution used for washing the gases leaving the reactor, KF was present in an amount corresponding to the oxidation of 44 g. of $C_2F_4$. The mixture of unreacted gases coming from the final condensation consisted of 22 g. of $C_2F_4$ and 16.2 g. of tetrafluoroethylene epoxide.

The oily polymeric residue, by elemental analysis, showed an average composition of 62.0% and 19.60% of C, corresponding to the formula $CF_2O_{0.70}$. Iodometric analysis revealed an active oxygen content of 3.10 g. per 100 g. of product.

N.M.R. analysis showed the polyether chain to consist of —$CF_2$— and —$C_2F_4$— units in a ratio of 1:2.8.

EXAMPLE 11

There was assembled an apparatus such as to allow for U.V. irradiation, in the presence of oxygen, of a liquid phase consisting of an inert solvent containing tetrafluoroethylene in solution in a reactor from which the fluorooxygenated polymeric liquid formed during the reaction could be continuously withdrawn.

For this purpose there was used a glass reactor having a capacity of 600 cc. and a cylindrical shape and axially contained therein, a quartz tube in which there was placed a U.V. ray lamp of the Hanau Q 81 medium pressure Hg-vapor type. The reactor also contained a dipping tube for the introduction of a gaseous stream of oxygen and tetrafluoroethylene, and a reflux condenser kept at a temperature of −78° C., from which the stream of unreacted gases and of the volatile reaction products emerged. The gases leaving this condenser were bubbled through an aqueous KOH solution in order to remove and neutralize the volatile acid reaction products and were then dried and condensed in a trap kept at such temperature as to retain unreacted $C_2F_4$ and tetrafluoroethylene epoxide.

The reactor was also provided with a bottom discharge valve through which it was possible to continuously withdraw a specified amount of the reaction mixture. This was discharged (continuously) to a fractional distillation system from which the volatile solvent, the unreacted olefin therein dissolved, and other compounds (if any) boiling below 20° C. were sent to a condenser kept at −78° C., and finally again introduced, in the liquid state, into the photochemical reactor. The liquid reaction products were thus separated and collected.

It is evident that such an apparatus required the use, as inert solvent, of a substance which is gaseous at room temperature and which is easily condensable at a temperature of −78° C. Very suitable for this purpose is dichlorodifluoromethane (boiling point −29° C.).

500 cc. of $CCl_2F_2$ were initially introduced into the reactor and then, through the dipping tube, there was bubbled a gaseous stream of 30 l./hour of oxygen and 15 l./h. of tetrafluoroethylene.

By means of a bath placed outside the reactor, the temperature of the reaction mixture was brought to between −49° and −51° C. and was kept at this value during the entire reaction time.

The lamp was switched on and irradiation and feeding of the gaseous mixture was carried out for 35 hours. At the end of the second hour, there was commenced the withdrawal from the reactor bottom and the continuous feed to the abovedescribed fractionation system of such an amount of reaction mixture per hour that the amount of oily product thus withdrawn from the reactor was 25–30 g./h. That is, the amount withdrawn was the same as that formed by photochemical reaction during the same period of time. The concentration of oily products in the solution contained in the reactor was thus kept constant over the entire time of the run.

In this example, such a concentration was about 60 g./liter. At the end of the 35 hours of reaction, the lamp was switched off and the solvent contained in the reactor was evaporated in order to recover all the product obtained in the synthesis. A total of 953 g. of an oily polymeric product was thus obtained. In the aqueous KOH solution used for washing the gases leaving the reactor, KF was determined in an amount corresponding to the oxidation of 560 g. of $C_2F_4$. In the final condensation of the gases leaving the reactor, there was removed a mixture consisting of 460 g. of unreacted $C_2F_4$ plus 615 g. of tetrafluoroethylene epoxide.

The oily polymeric product, by elemental analysis, showed an average composition of 62.4% of F and 19.70% of C, corresponding to the formula $CF_2O_{0.69}$, with an average molecular weight of about 15,000. Iodometric analysis showed an active oxygen content of 2.9 g. per 100 g. of product. The N.M.R. analysis showed that the polyether chains consisted of —$CF_2$— and —$C_2F_4$— units in a ratio of 1:2.5.

Through a separatory funnel having a volume of 5 cc., 4.1 g. of the above obtained crude fluoro-oxygenated oil were slowly dropped into a 10 cc. flask kept immersed in an oil bath at a temperature of 200° C. A vigorous reaction occurred with a marked evolution of gases which consisted essentially at least 95%) of $COF_2$. The oily residue was heated to 240° C. and kept at this temperature for 15 minutes. 1.8 g. of an oily substance were obtained. Iodometric analysis revealed the absence of active oxygen therein. N.M.R. analysis showed that the polyether chains of this residue consisted of —$CF_2O$— and —$C_2F_4O$— units in the ratio of 1:2.34.

An additional 781 g. of crude polyether product, obtained directly by the above described synthesis, were placed in a 600 cc. cylindrical reactor containing a quartz cylindrical tube containing an U.V. lamp of the Hanau Q 81 type.

Keeping the reactor immersed in a running water bath so that the temperature of the product did not exceed 25°–30° C., and while bubbling therethrough a weak nitrogen stream in order to remove the volatile substances as soon as they were formed, the lamp was switched on and irradiation was carried out for 40 hours. At the end of this irradiation, in the reactor there were 568 g. of an oily polyether product which, by iodometric analysis, revealed the absence of active oxygen and, by N.M.R. analysis, showed that it contained only the ether units —$CF_2O$— and —$C_2F_4O$—, in a ratio of 1:1.29.

A portion (500 g.) of oily product coming from the above described photochemical treatment was heated in the presence of 25 g. of 80% KOH. The heating was carried out in a flask provided with a mechanical agitator and the temperature was gradually raised to 240° C. and was kept there for 20 hours. The residual mixture was filtered and was then subjected to distillation. There were obtained 26 g. of an oily product boiling at between 140° C. and 210° C. (under a reduced pressure of 0.1 mm. Hg) and having a viscosity of 10 cs. (centistokes) at 20° C., 35 g. of a product boiling at between 210° C. and 270° C. (under a reduced pressure of 0.1 mm. Hg) having a viscosity of 20 cs. at 20° C., and 84 g. of a product boiling at between 270° and 360° C. (under a reduced pressure of 0.1 mm. Hg) having a viscosity of 47 cs. at 20° C. The non-distillable residue consisted of 310 g. of an oily product having a viscosity of 247 cs. at 20° C. and having an exceptionally high index of viscosity, higher than 300 (ASTM D 2270–64) as shown by viscosity values of 142 cs. at 37.8° C. (100° F.) and of 38 cs. at 99° C. (210° F.). The average molecular weight of this fraction was well in excess of 10,000.

All the above fractions were neutral in character, having terminal groups only of the $CF_3O$— and $CF_2HO$— type. They were fluids having very good lubricating and dielectric characteristics and excellent values of thermal stability so that they could be heated to a temperature of about 450° C. for long periods of time without showing any apparent degradation.

They were also inert towards oxidation (and the action of oxygen), acid and alkaline chemical reactants, and to all of the common organic solvents.

EXAMPLE 12

Using the apparatus described in Example 1, 500 cc. of $CCl_2F_2$ were introduced into the reactor. Through the dipping tube a gaseous mixture of 30 l./h. of oxygen and 15 l./h. of tetrafluoroethylene was bubbled.

By means of a bath placed outside the reactor, the reaction mixture was cooled to −40° C. and was kept at this temperature for the duration of the run. A U.V. lamp of the Hanau HK 6/20 low-pressure Hg vapor type was introduced into the quartz tube of the reactor. The lamp was switched on and irradiation and feeding of the gaseous mixture were carried out for 2 hours. Thereafter, the solvent was removed and there were obtained 9 g. of a semisolid polymeric product. A sample of this product violently decomposed upon heating to 180–200° C.

This product, by iodometric analysis, showed an active oxygen content of 5.6 g. per 100 g. of product. N.M.R. analysis showed it to consist of perfluoroalkylene units of the two types —$CF_2$— and —$C_2F_4$—, in the ratio of about 1:10, linked through either ether or peroxidic bridges.

EXAMPLE 13

0.5 g. of peroxidic copolyether obtained according to Example 12 (5.6 g. of active oxygen per 100 g. of product) were introduced under nitrogen into a 2-liter glass flask containing 1200 cc. of distilled and deaerated water. By vigorous mechanical stirring, the fluorinated compound was dispersed in the aqueous medium. The dispersion was introduced, by siphoning, into a previously evactuated 2.5-liter stainless steel autoclave provided with a propeller agitator, thermometer, manometer, and heating jacket.

The autoclave was then connected with a compressor by means of which tetrafluoroethylene was introduced up to a pressure of 20 atmospheres. Even at room temperature, the polymerization reaction started, it was continued by keeping the pressure at 20 atmospheres for 1½ hours at a temperature of 30–35° C. At the end, unreacted monomeric tetrafluoroethylene was discharged and, by opening the autoclave, 320 g. of polymer in the form of a white powder were obtained. This polymer was washed with $H_2O$, dried in an oven at 150° C., and was subjected to the conventional determinations for polytetrafluoroethylene. It was shown to have very good mechanical and thermal stability characteristics.

Thus, this example illustrates an advantageous use of those products of the invention that are characterized by a high content of peroxidic bridges for initiating, at temperatures which can be unusually low, the polymerization of vinyl monomers, more particularly, fluorinated olefins.

EXAMPLE 14

By following the method of Example 11 as regards both the photochemical synthesis of the copolyether and the successive treatments for eliminating the peroxidic bridges and the terminal acid groups, 4.5 kg. fo a copolyether were prepared consisting of $CF_2O$ and $C_2F_4O$ units in a molar ratio of 1:1.3, with terminal groups consisting solely of $CF_3O$— and $CF_2HO$—, this copolyether being obtained as the residue of distillation at 350° C. (under a vacuum of 0.1 mm. Hg). The product was a colorless liquid having a density of about 1.8 and a viscosity of 240 cs. at 20° C.

1800 cc. of this perfluorinated copolyether oil were introduced into the body of a rotating mechanical pump of the Es 150 type, manufactured by "Edwards High Vacuum." (Previously, the pump had been carefully treated so as to remove the hydrocarbon oil initially contained.)

The pump was started, and, by experimental instrumentation, it was observed that the flow rate performance of the pump remained the same as that obtainable with the use of the hydrocarbon oil, whereas the ultimate vacuum level obtained exceeded a value of $10^{-2}$ mm. Hg.

This performance remained virtually constant over a long period of use of the pump, connected with apparatuses in which vacuum was to be applied, and shows the advantage that, since the perfluorinated oil used is completely immiscible with the usual organic solvents (ether, petroleum ether, acetone, benzene, etc.) no pollution occurs and, therefore, no decrease of performance, even when the pump sucks in vapors of the said solvents. This is in distinct contrast to what would happen when using a normal hydrocarbon oil. The particular usefulness of the perfluorinated oil used is even more evident when the above described mechanical pump is used in an industrial process for solving the problem of recycling (6.5 m.³/hour) a gaseous mixture consisting of 85% oxygen, 10% $COF_2$ and 5% $CF_3COF$, under essentially atmospheric pressure.

After a completely normal functioning for 1800 hours during which time the only maintenance operation consisted of filling up the pump with the fluoro-oxygenated oil therein contained, the pump was controlled again in its performance, which was practically the same as its initial one, and was then disassembled. On the inner metal surfaces, even those in mutual contact, no sign of alteration, e.g., caused by corrosion or oxidation, was observed.

Under the same conditions of use, an identical pump containing a hydrocarbon oil stopped working after a short period of time (37 hours) due to (1) remarkably high alteration of the oil (oxidation, polymerization, volatilization) and (2) corrosion of the inner parts. Thus, this example shows the convenient use of the fluoro-oxygenated oil when there are required characteristics of extreme resistance to corrosive chemicals and to oxidation, very good lubricating and protective action on the metal surfaces, and very low volatility.

Variations can, of course, be made without departing from the spirit of our invention.

Having thus described our invention, what we desire to secure and claim by Letters Patent is:

1. A perfluorinated polyether having a chain structure consisting essentially of —$CF_2$—$CF_2$—O— and

—$CF_2$—O— repeating units, said repeating units being randomly distributed along the chain and linked one to another either directly or through an oxygen atom, at least one of said units being linked to another through an oxygen atom whereby a peroxy group is present along the chain, the sum of the repeating units present along the chain being from 2 to 200, the ratio of the total —$CF_2$—O— units to the total —$CF_2$—$CF_2$—O— units being from 0.1 to 10, the ratio of the total active peroxidic oxygen units to the total —$CF_2$—$CF_2$—O— units being from in excess of zero to 1, and the ratio of the total active peroxidic oxygen units to the sum of all repeating units being from in excess of zero to 0.8, said polyether having the same or different terminal groups selected from the group consisting of —$CF_3$, —COF and —$CF_2$—COF, which terminal groups are linked to the chain through an ether oxygen linkage.

2. The polyether of claim 1 wherein the ratio of the total —$CF_2$—O— units to the total —$CF_2$—$CF_2$—O— units is from 0.2 to 5, wherein the ratio of the total active peroxidic oxygen units to the total —$CF_2$—$CF_2$—O— units is from in excess of zero to 0.3 and the ratio of the total active peroxidic oxygen units to the sum of all repeating units is from in excess of zero to 0.3.

3. A method for the preparation of tetrafluoro ethylene epoxide and the linear perfluorinated copolyethers of claim 1 comprising photochemically reacting molecular oxygen with a liquid phase comprising a solution of perfluoroethylene in an inert solvent, in the presence of ultraviolet light containing radiations having a wave length less than 3,300 A., the reaction being carried out at a temperature between —80° C. and +10° C., and a pressure between 0.5 and 10 atmospheres, the concentration in said inert liquid solvent of dissolved perfluoroethylene being from 0.005 to 1 mole/liter of solution, and the reaction solution being kept saturated with molecular oxygen with an $O_2$ partial pressure from 0.3 to 2 atmospheres.

4. The method of claim 3 wherein the reaction is carried out at a temperature of about —60 to +10° C.

5. The method of claim 3 wherein the reaction is carried out at a pressure that is about atmospheric.

6. The method of claim 3 wherein the concentration of $C_2F_4$ dissolved in the inert liquid solvent is from about 0.015 to 0.5 mole/liter of solution.

7. The method of claim 3 wherein the $O_2$ partial pressure is from about 0.5 to 1 atmosphere.

References Cited

FOREIGN PATENTS 6504428  10/1965  Netherlands.

LORRAINE A. WEINBERGER, Primary Examiner

R. D. KELLY, Assistant Examiner

U.S. Cl. X.R.

204—158 R; 252—54, 54.6, 77, 79; 260—32.6 R, 33.2 R, 92.1, 465.6, 484 R, 535 H, 544 F, 561 HL, 610 R, 615 BF

UNITED STATES PATENT OFFICE
CERTIFICATE OF CORRECTION

Patent No. 3,715,378   Dated February 6, 1973

Inventor(s) DARIO SIANESI, ADOLFO PASETTI and GIORGIO BELARDINELLI

It is certified that error appears in the above-identified patent and that said Letters Patent are hereby corrected as shown below:

Column 4, line 59, "lower" should read -- low --.

Column 6, line 1 of the Table: Insert a -- period (.) -- after ".O.$CF_2CF_2$.O.$CF_2$.O.$CF_2$.$CF_2$.O". Column 6, line 5 of the Table: Insert a -- period (.) -- after ".O.$CF_2$.O.$CF_2$.$CF_2$.O.$CF_2$.O". Column 6, line 6 of the Table: Insert a -- period (.) -- after: "$CF_3$.O.$CF_2$.O". Column 6, line 62: "-O.$CF_2CF_2OCOF$" should read -- -O.$CF_2$.$CF_2$.O.COF --. Column 6, line 64: "-O.$CF_2$.$CF_2$O.($CF_2$O)$_n$.COF)" should read -- -O.$CF_2$.$CF_2$.O.($CF_2$O)$_n$.COF). --. Column 7, line 21: "Non-peroxide" should read -- Non-peroxidic --. Column 8, line 22: "atom" should read -- atoms --. Column 8, line 33: "$CF_3$O.$CF_2$.$CF_2$.O-" should read -- $CF_3$O.$CF_2$.$CF_2$.O-, --. Column 8, line 34: "namely:" should read -- namely, --. Column 8, line 35: Delete "and". Column 8, line 37: Insert -- and -- after "-O.$CF_2$.O.$CF_2$.COF,". Column 8, line 71: "atom" should read -- atoms --. Column 9, lines 11-12: "analysis examination, the" should read -- analysis, the --. Column 9-10, Table: "Average structure, A-O($C_2F_4$O)$_P$-($CF_2$)O$_Q$-(O)$_R$-B:" should read -- Average structure, A-O($C_2F_4$O)$_P$-($CF_2$O)$_Q$-(O)$_R$-B --. Column 9-10, Table, column 3, on the same line as "Active oxygen content...": "24.9" should read -- 2.49 --. Column 9, line 72: "irradiation of feeding" should read -- irradiation and feeding -- Column 10, line 69: "was" should read -- were --. Column 10, line 72: "atmosphere" should read -- atmospheres --. Column 12, line 27: "62.0% and 19.60%" should read -- 62.0% of F and 19.60% --. Column 15, line 2: "fo" should read

-1-

PO-1050
(5/69)

UNITED STATES PATENT OFFICE
CERTIFICATE OF CORRECTION

Patent No. 3,715,378   Dated February 6, 1973

Inventor(s) DARIO SIANESI, ADOLFO PASETTI and GIORGIO BELARDINELLI

It is certified that error appears in the above-identified patent and that said Letters Patent are hereby corrected as shown below:

-- of --. Column 15, line 28: "vapors of the said" should read -- vapors of said --. Column 15, line 39: "fluorooxygenated" should read -- fluorooxygenated --. Column 16, lines 25 and 26, "tetrafluoro ethylene" should read -- tetrafluoroethylene --. Column 16, line 31: "3,300 Å.," should read -- 3,300 Å., --.

Signed and sealed this 17th day of September 1974.

(SEAL)
Attest:

COY M. GIBSON JR.
Attesting Officer

C. MARSHALL DANN
Commissioner of Patents